United States Patent
Cogen et al.

(10) Patent No.: US 8,067,494 B2
(45) Date of Patent: Nov. 29, 2011

(54) MAGNESIUM HYDROXIDE-BASED FLAME RETARDANT COMPOSITIONS MADE VIA IN-SITU HYDRATION OF POLYMER COMPOUNDS COMPRISING MAGNESIUM OXIDE

(75) Inventors: Jeffrey M. Cogen, Flemington, NJ (US); Ashish Batra, Lake Jackson, TX (US); Geoffrey D. Brown, Bridgewater, NJ (US); Paul D. Whaley, Hillsborough, NJ (US)

(73) Assignee: Dow Global Technologies LLC, Midland, MI (US)

( * ) Notice: Subject to any disclaimer, the term of this patent is extended or adjusted under 35 U.S.C. 154(b) by 11 days.

(21) Appl. No.: 12/444,785

(22) PCT Filed: Oct. 29, 2007

(86) PCT No.: PCT/US2007/082860
§ 371 (c)(1),
(2), (4) Date: Apr. 8, 2009

(87) PCT Pub. No.: WO2008/055109
PCT Pub. Date: May 8, 2008

(65) Prior Publication Data
US 2010/0087579 A1    Apr. 8, 2010

Related U.S. Application Data

(60) Provisional application No. 60/863,502, filed on Oct. 30, 2006.

(51) Int. Cl.
*C01F 5/16* (2006.01)
*C08K 3/22* (2006.01)

(52) U.S. Cl. ........ 524/433; 524/436; 528/499; 423/164; 423/635; 423/636

(58) Field of Classification Search .................. 524/436, 524/433; 423/164, 155, 635, 636; 528/499
See application file for complete search history.

(56) References Cited

U.S. PATENT DOCUMENTS

| | | |
|---|---|---|
| 3,225,018 A | 12/1965 | Zutty |
| 3,646,155 A | 2/1972 | Scott |
| 4,353,997 A * | 10/1982 | Keogh ........................ 523/210 |
| 4,451,610 A * | 5/1984 | Collister ........................ 525/19 |
| 4,574,133 A | 3/1986 | Umpleby |
| 4,868,053 A | 9/1989 | Ohm et al. |
| 5,073,319 A * | 12/1991 | Sterzel ........................ 264/101 |
| 5,631,045 A * | 5/1997 | Yaniv ............................ 427/221 |
| 6,232,377 B1 | 5/2001 | Hayashi et al. |
| 6,238,727 B1 * | 5/2001 | Takemoto et al. ............ 426/656 |
| 6,331,597 B1 | 12/2001 | Drumright et al. |
| 6,339,189 B1 | 1/2002 | Caimi |
| 6,420,485 B1 | 7/2002 | Suzuki et al. |
| 6,787,607 B2 * | 9/2004 | Sahnoune et al. ............ 525/191 |
| 6,809,129 B2 | 10/2004 | Abu-Isa |
| 7,686,986 B2 * | 3/2010 | Zhou et al. .................... 252/609 |
| 2003/0139492 A1 | 7/2003 | Abu-Isa |
| 2009/0258993 A1 * | 10/2009 | Steinmeyer et al. .......... 524/599 |

FOREIGN PATENT DOCUMENTS

| | | |
|---|---|---|
| EP | 0364717 A1 | 4/1990 |
| EP | 0393959 A2 | 10/1990 |
| EP | 0568488 A2 | 11/1993 |
| EP | 0700962 A1 | 3/1996 |
| EP | 1063199 A1 | 12/2000 |
| GB | 2424898 | 10/2006 |
| JP | 11079736 A * | 3/1999 |
| JP | 2003239135 A * | 8/2003 |
| WO | 2006026256 A1 | 3/2006 |
| WO | 2007097795 A2 | 8/2007 |

OTHER PUBLICATIONS

Derwent Abstract for JP 11079736 A (Derwent Acc No. 1999-261212).*
Machine translated English equivalent of JP 2003239135 A (Aug. 2003, 6 pages).*

* cited by examiner

*Primary Examiner* — Milton I Cano
*Assistant Examiner* — Brieann R Fink
(74) *Attorney, Agent, or Firm* — Whyte Hirschboeck Dudek SC

(57) ABSTRACT

Magnesium oxide (MgO) compounded into a polymer can subsequently be hydrated in-situ within the polymer to form magnesium hydroxide. In the case of silane-based or peroxide-based crosslinkable resins, the MgO hydration and polymer crosslinking can be done in a single process step, or in sequential steps. In the case of non-crosslinkable compounds, hydration can be carried out after compounding (no crosslinking step). In all cases, steam CV, sauna, or hot water bath are options for hydration. This approach enables preparation of polymer compounds that are flame retarded with metal hydrates yet free of the traditional limitations posed by shelf instability, extrusion scorch, undesired dehydration, and processing temperature limitations posed by metal hydrates.

6 Claims, 8 Drawing Sheets

Figure 1 (a) Percentage conversion of MgO to Mg(OH)$_2$ as a function of time in a 90°C water bath. (b) Percentage gel content as a function of time in a 90°C water bath.

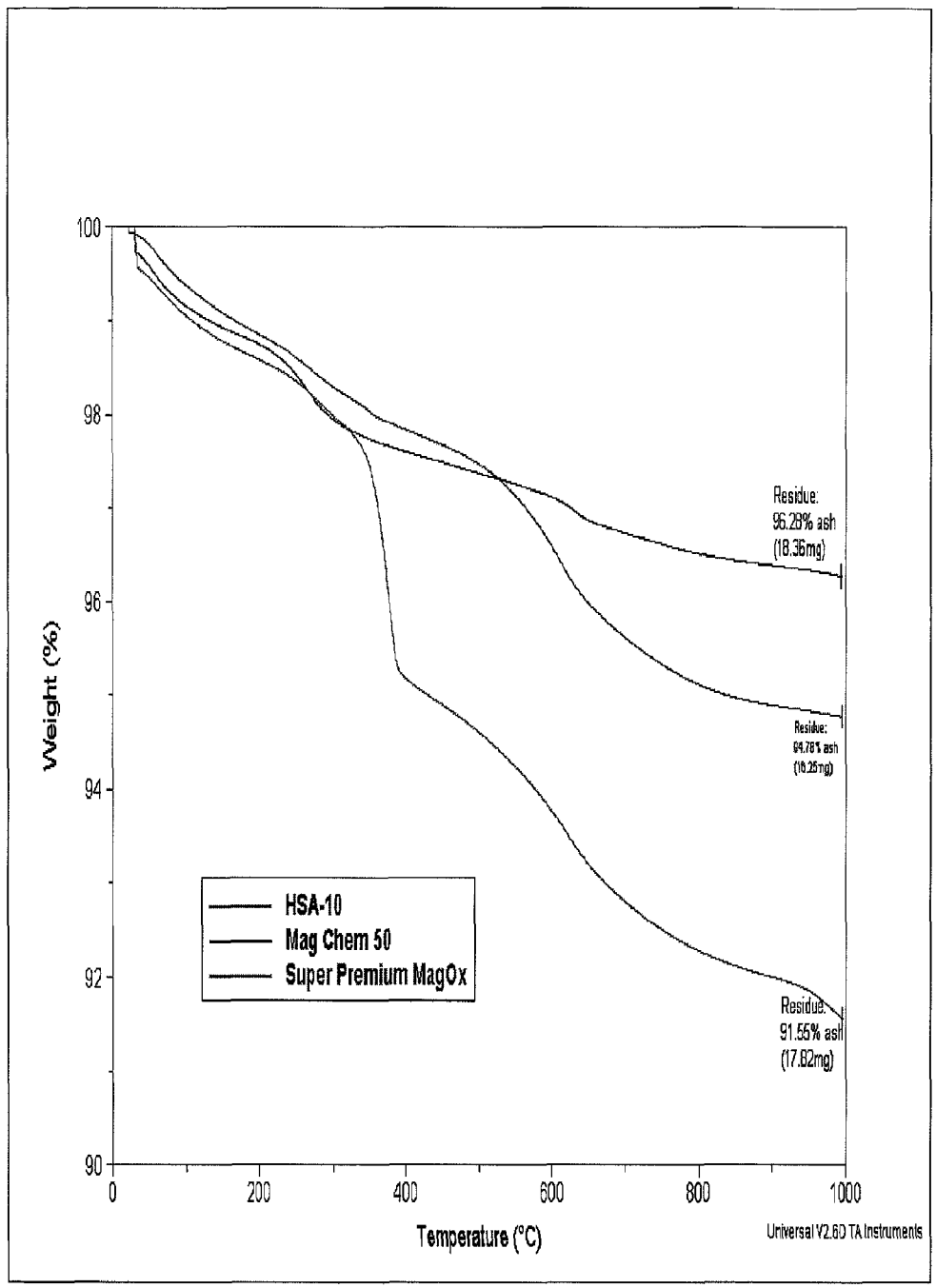
Figure 2 TGA residual weight% of three MgO powders

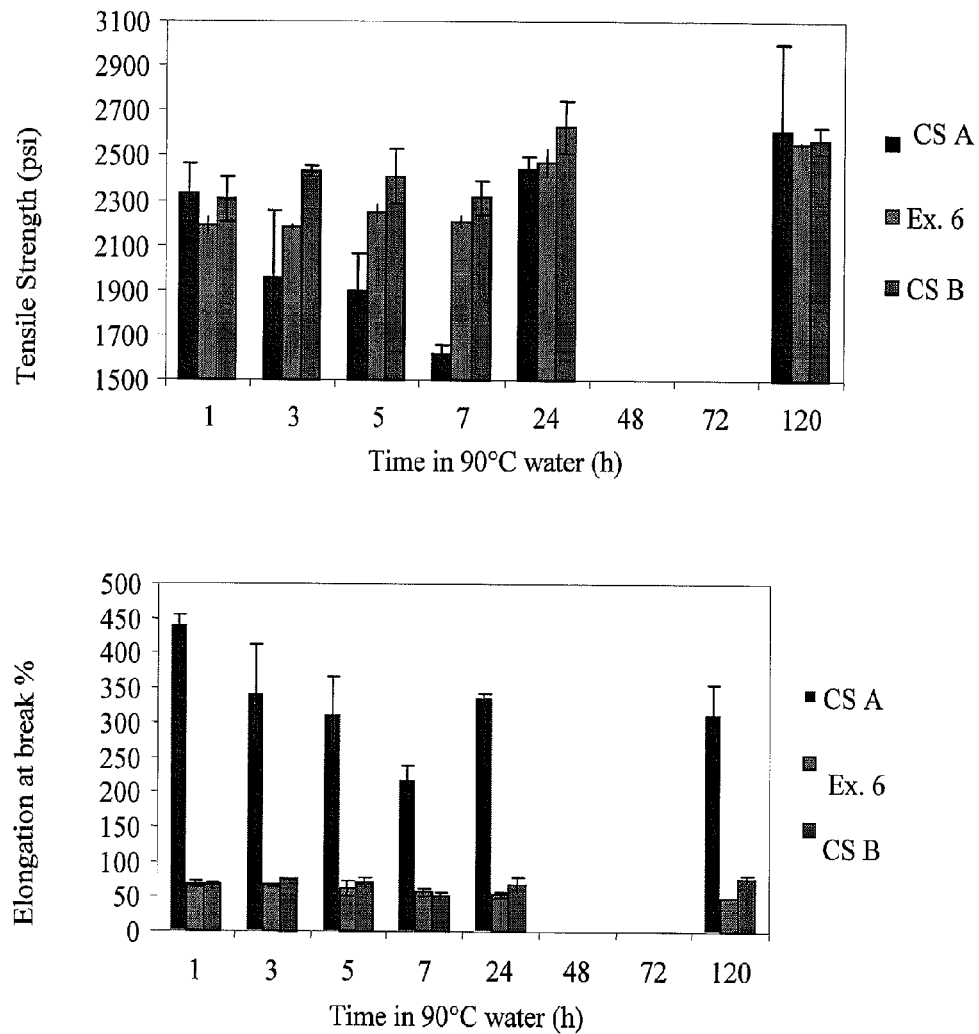
Figure 3. Ultimate tensile strength (top) and elongation at break (bottom) of formulations containing Mg(OH)$_2$ or MgO (and a control with no filler).

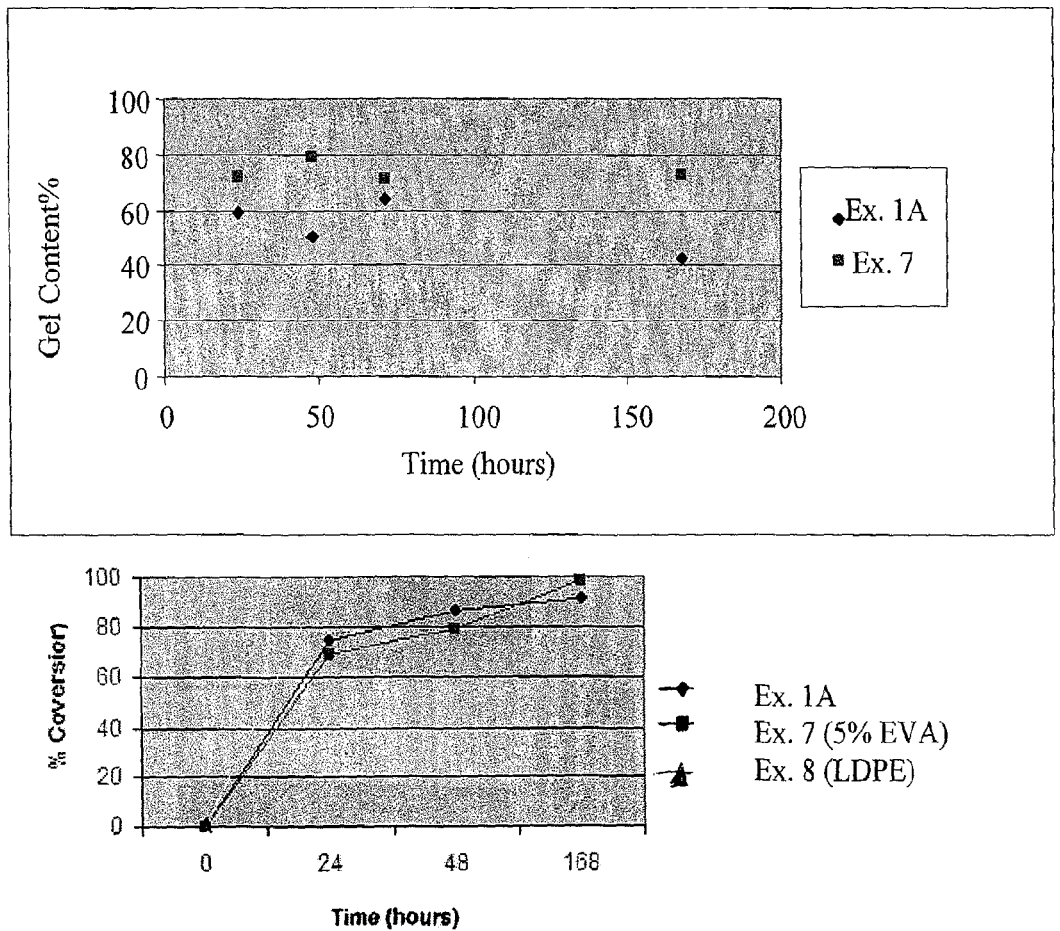
Figure 4 Percentage gel content as a function of time in a 90°C water bath (top). Percentage conversion of MgO into Mg(OH)$_2$ as a function of time in a 90°C water bath (bottom).

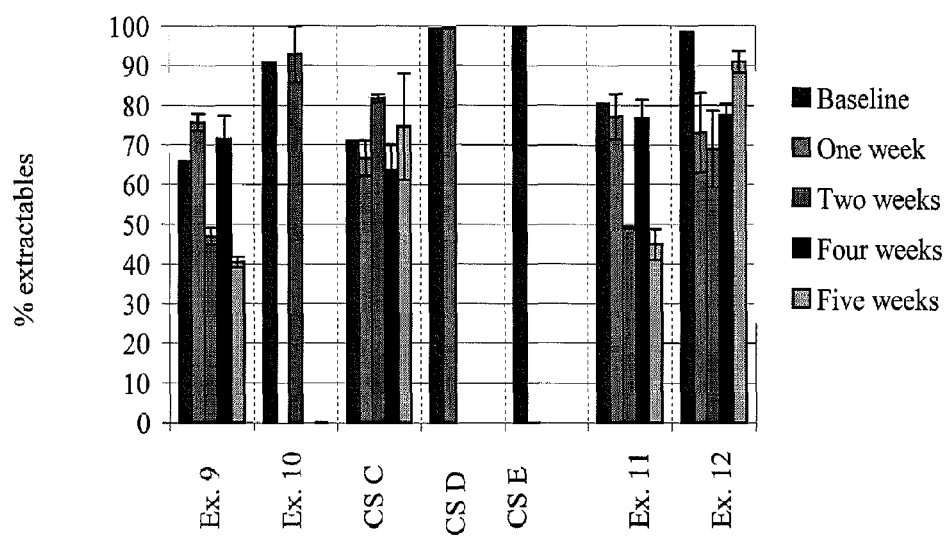
Figure 5. Percentage extractables as a metric to characterize shelf-life stability.

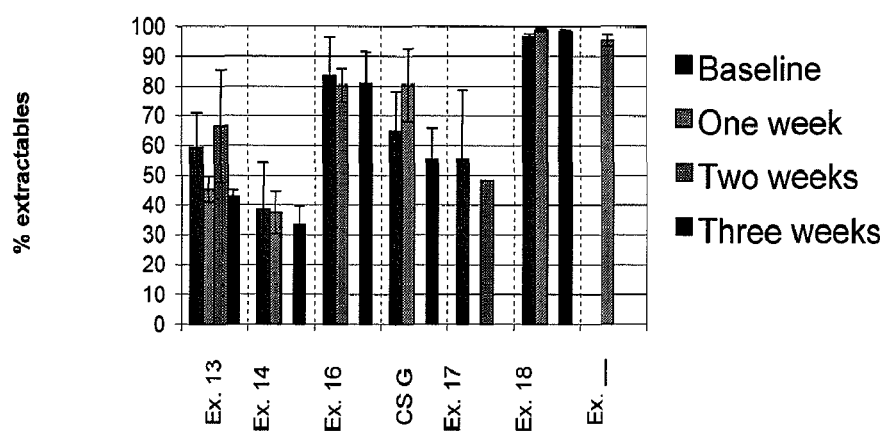
Figure 6. Percentage extractables as a metric to characterize shelf-life stability.

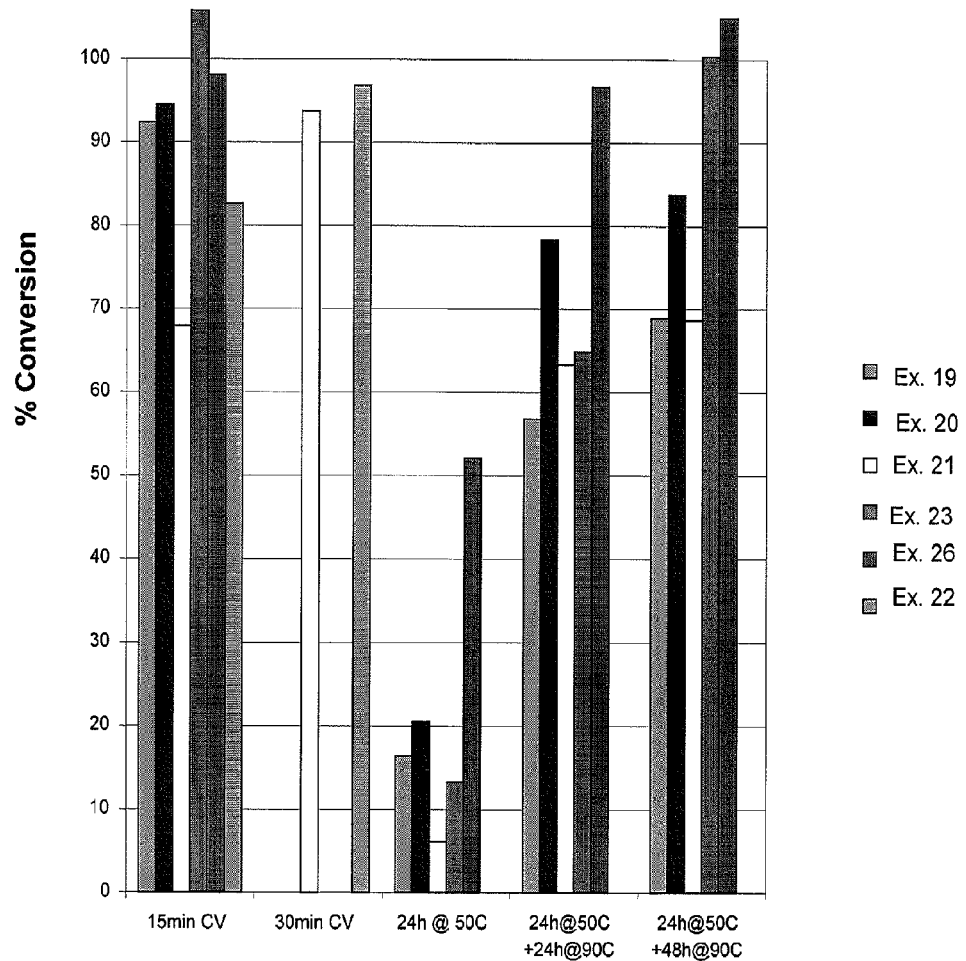
Figure 7. Percentage conversion of MgO to Mg(OH)$_2$ as a function of the condition of hydration.

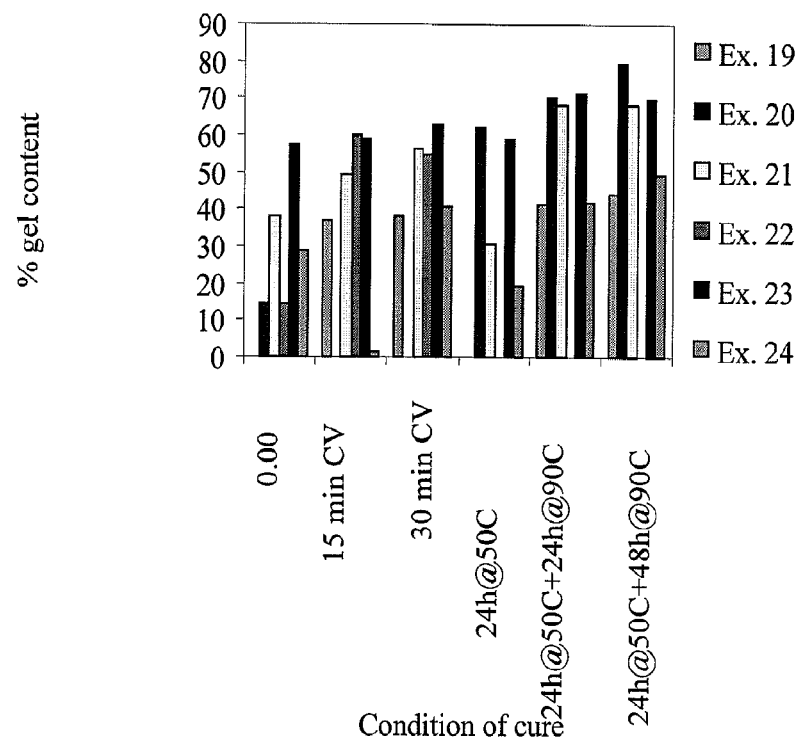
Figure 8. Percentage gel content as a function of the condition of hydration.

MAGNESIUM HYDROXIDE-BASED FLAME RETARDANT COMPOSITIONS MADE VIA IN-SITU HYDRATION OF POLYMER COMPOUNDS COMPRISING MAGNESIUM OXIDE

CROSS-REFERENCE TO RELATED APPLICATION

This application is a 35 U.S.C. 371 National Stage entry of PCT Application Serial No. PCT/US07/82860 filed on Oct. 29, 2007, claims the benefit of U.S. provisional patent application No. 60/863,502 titled "Magnesium Hydroxide-Based Flame Retardant Compositions Made via In-Situ Hydration of Polymer Compounds Comprising Magnesium Oxide" filed on Oct. 30, 2006, which is hereby incorporated by reference herein.

FIELD OF THE INVENTION

This invention relates generally to flame retardant polymers and specifically to such polymers that contain magnesium hydroxide as a flame retardant.

BACKGROUND OF THE INVENTION

Metal hydrates such as aluminum trihydroxide (ATH) and magnesium hydroxide $(Mg(OH)_2)$ are effective flame retardants for many polyolefin systems. However, these metal hydrates cannot be used in many systems because of shelf-life and processing issues. For example, because they absorb water from the environment, have hydroxyl groups in their structure, and partially dehydrate during processing, they give limited shelf-life and can cause scorch problems in moisture crosslinkable resins. Furthermore, polymer compounds (thermoplastic, peroxide crosslinkable, and moisture crosslinkable) containing metal hydrates must be compounded and extruded at temperatures below the dehydration temperatures of the metal hydrates in order to avoid loss of activity of these flame retardants and to avoid undesired foaming that results from dehydration of the metal hydrates. What is needed is a way to prepare polymer compounds that are flame retarded with metal hydrates yet free of the above-mentioned limitations posed by shelf-instability, extrusion scorch, undesired dehydration, and processing temperature limitations.

BRIEF SUMMARY OF THE INVENTION

Magnesium oxide (MgO) compounded into a polymer can subsequently be hydrated in-situ within the polymer to form magnesium hydroxide. In the case of silane-based or peroxide-based crosslinkable resins, the MgO hydration and polymer crosslinking may be done in a single process step or in sequential steps. In the case of non-crosslinkable compounds, hydration can be carried out after compounding (no crosslinking step). This approach enables preparation of polymer compounds that are flame retarded with metal hydrates yet are free of the traditional limitations posed by shelf-instability, extrusion scorch, undesired dehydration, and processing temperature limitations posed by metal hydrates.

In one embodiment, the invention is a method to make a flame retardant composition. The method comprises melt compounding one or more polymers with at least about 10% by weight, based on the weight of the polymers, of magnesium oxide and subsequently hydrating at least about 50% of the magnesium oxide within the composition to magnesium hydroxide.

Another embodiment of the invention is a method to make a moisture-curable flame retardant composition. The method comprises melt compounding one or more polymers with at least about 10% by weight, based on the weight of the polymers, of magnesium oxide, wherein the polymers comprise silane functional groups and subsequently hydrating at least about 50% of the magnesium oxide within the composition to magnesium hydroxide.

In yet another embodiment, the invention is an intermediate for making a moisture-cured composition. The intermediate comprises at least one polymer comprising moisture-curable silane functional groups and at least about 10% by weight, based on the weight of the polymers, of magnesium oxide.

DETAILED DESCRIPTION OF THE DRAWINGS

FIG. 2 is a line graph of TGA residual weight percentage of magnesium oxide powders.

FIG. 3 shows bar charts of ultimate tensile strength and elongation at break of formulations containing magnesium hydroxide or magnesium oxide.

FIG. 4 shows a scatter plot of percentage gel content as a function of time in a 90° C. water bath and a line graph of percentage conversion of magnesium oxide and a magnesium hydroxide as a function of time in a 90° C. water bath.

FIG. 5 is a bar chart showing percentage extractables over time.

FIG. 6 is a bar chart showing percentage extractables over time.

FIG. 7 is a bar chart showing percentage conversion of magnesium oxide to magnesium hydroxide as a function of the condition of hydration.

FIG. 8 is a bar chart showing percentage gel content of the function of the condition of hydration.

DETAILED DESCRIPTION OF THE INVENTION

Figure 1A:
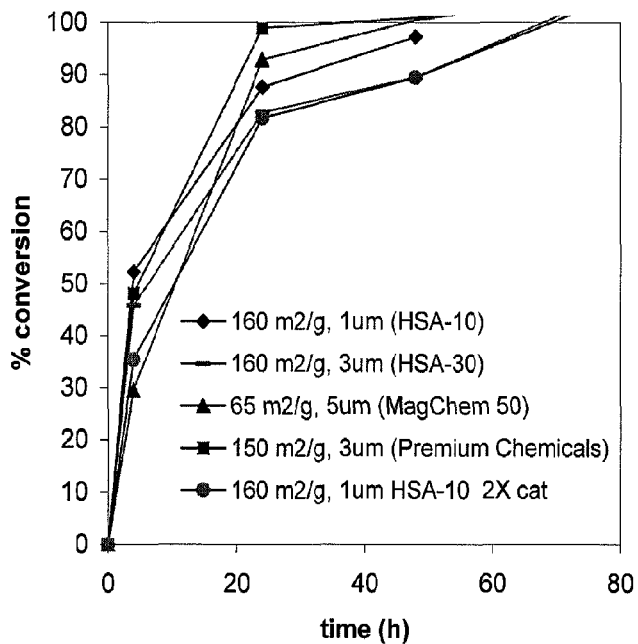
FIG. 1A is a line graph showing percentage conversion of magnesium oxide to magnesium hydroxide as the function of time in a 90° C. water bath.

We have discovered that magnesium oxide (MgO) compounded into a polymer can subsequently be hydrated in-situ within the polymer to form magnesium hydroxide (Mg (OH)$_2$). Despite the fact that the MgO must expand by approximately 18% as it is converted into Mg(OH)$_2$, this hydration is surprisingly able to occur rapidly at temperatures above ambient but below the melting point of the polymer despite the MgO being encapsulated within the semi crystalline polymer. At temperatures above the melting point of the polymer, the hydration occurs fast enough to carry it out within a steam continuous vulcanization (CV) tube. In the case of silane-based or peroxide-based crosslinkable resins, both MgO hydration and polymer crosslinking can be done in a single process step in a CV tube. Alternatively, hydration can be done in a water bath or sauna.

This invention can be used with any thermoplastic, peroxide crosslinkable, or moisture crosslinkable polymers. Non-limiting examples of such polymers include polyolefins (including those listed in WO2006026256), polyamides, polystyrenes, acrylic resins, polyvinyl chlorides, polyurethanes, polyesters, or such polymers further comprising silane functional groups, epoxy functional groups, or other functional groups that will react to crosslink the polymer resin in the presence of water. This invention can be especially advantageous with polymers containing moisture crosslinkable functional groups and with polymers having melting points and/or processing temperatures above the decomposition temperature of $Mg(OH)_2$.

Polymers with silane functional groups are well-known in the field. Such polymers can be made either by copolymerization with a vinyl silane monomer or by one of many methods for grafting a silane-containing molecule to the backbone of a polymer chain. Examples of such techniques are disclosed in U.S. Pat. Nos. 3,646,155; 6,420,485; 6,331,597; 3,225,018; and 4,574,133, all of which are incorporated herein by reference. Polymers with silane functional groups are also commercially available, for example, SI-LINK™ ethylene-vinyltrimethoxysilane copolymers available from Dow Chemical Co.

The compositions of the invention comprise MgO at levels greater than about 10 wt %, preferably greater than 20 wt %, and most preferably greater than 30 wt %, based on the weight of the polymer resins in the composition. Magnesium oxide is available in a variety of grades based on surface area, purity and presence of $Mg(OH)_2$. Choosing a specific grade of MgO for a given application is a balance of impurities, surface area, and residual $Mg(OH)_2$. High surface area grades of MgO have the advantage of most rapid hydration. However, many commercially available high surface area magnesium oxides provide insufficient shelf life stability in silane-based crosslinkable resins, possibly due to a combination of impurities within the MgO and residual high surface area $Mg(OH)_2$ within the starting MgO. Although grades of MgO having low surface area exhibit better shelf stability in silane-based crosslinkable compositions, they hydrate more slowly and are therefore less useful in these applications. Grades of MgO having intermediate surface area provided adequate rates of hydration and sufficient shelf life stability with silane-based resins. It is also anticipated, based on these observations, that high surface area grades of MgO with very low levels of $Mg(OH)_2$ would provide both rapid hydration and sufficient shelf life. Generally, an acceptable shelf life for a resin is at least six months.

The flame retardant composition may be made in a two step process of 1) melt compounding one or more polymers with at least about 10% by weight of MgO, and 2) hydrating most or all of the MgO within the resulting polymer compound. The MgO is hydrated in the hydration step to at least about 50% completion, and preferably to at least 75% completion. Hydration may be done in a steam chamber, a continuous steam vulcanization tube, a hot water sauna, or any other convenient means.

The MgO hydration step is done at temperatures above ambient, preferably at least about 50° C., with higher temperatures providing faster hydration rates.

The composition can also comprise additives that increase the rate or level of moisture penetration. These moisture penetration additives include polar co-resins or molecules. Non-limiting examples of such additives include EVA, PEG, polar small molecules, etc.

The composition can contain other flame retardants and fillers including talc, calcium carbonate, organoclay, glass fibers, marble dust, cement dust, feldspar, silica or glass, fumed silica, silicates, alumina, various phosphorus compounds, ammonium bromide, antimony trioxide, antimony trioxide, zinc oxide, zinc borate, barium sulfate, silicones, aluminum silicate, calcium silicate, titanium oxides, glass microspheres, chalk, mica, clays, wollastonite, ammonium octamolybdate, intumescent compounds, expandable graphite, and mixtures thereof. The fillers may contain various surface coatings or treatments, such as silanes, fatty acids, and the like. Halogenated organic compounds including halogenated hydrocarbons such as chlorinated paraffin, halogenated aromatic compounds such as pentabromotoluene, decabromodiphenyl oxide, decabromodiphenyl ethane, ethylene-bis(tetrabromophthalimide), dechlorane plus, and other halogen-containing flame retardants. One skilled in the art would recognize and select the appropriate halogen agent depending on the desired performance of the composition. The composition can further comprise various other additives. Moisture cure catalysts, such as dibutyltindilaurate or distannoxanes, are normally added for moisture-curable resins. Peroxides and free-radical initiators can be added for crosslinking the resin. Additives that may increase the hydration of MgO, such as CaO, may be included in the formulation. Additionally, pigments and fillers may be added as desired.

The composition can contain other additives such as, for example, antioxidants (e.g., hindered phenols such as, for example, IRGANOX™ 1010 a registered trademark of CibaSpecialty Chemicals), phosphites (e.g., IRGAFOS™ 168 a registered trademark of CibaSpecialty Chemicals), U.V. stabilizers, cling additives, light stabilizers (such as hindered amines), plasticizers (such as dioctylphthalate or epoxidized soy bean oil), thermal stabilizers, mold release agents, tackifiers (such as hydrocarbon tackifiers), waxes (such as polyethylene waxes), processing aids (such as oils, organic acids such as stearic acid, metal salts of organic acids), crosslinking agents (such as peroxides or silanes), colorants or pigments to the extent that they do not interfere with desired physical or mechanical properties of the compositions of the present invention, and other flame retardant additives. The above additives are employed in functionally equivalent amounts known to those skilled in the art, generally in amounts of up to about 65 percent by weight, based upon the total weight of the composition. The compositions of the present invention can be processed to fabricated articles by any suitable means known in the art. For example, the compositions can be processed to films or sheets or to one or more layers of a multilayered structure by know processes, such as calendering, blowing, casting or (co-)extrusion processes. Injection molded, compression molded, extruded or blow molded parts can also be prepared from the compositions of the present invention. Alternatively, the compositions can be processed to foams or fibers or extruded into wire and cable coatings such as jacketing and insulation.

EXAMPLES

Experimental

Unless stated otherwise, levels of MgO were selected such that after 100% hydration the compositions should contain 50% by weight of $Mg(OH)_2$.

Standard Compounding Method

Lab-scale compounds were prepared in a 250 cc Brabender mixer. The initial set temperature was 150° C. The mixing time was approximately five minutes for all samples at 50 rpm. The addition sequence was the polymers (e.g., ethylene-vinyltrimethoxysilane copolymer), followed by fillers and finally the masterbatch (e.g., dibutyltindilaurate in LDPE). The compounded materials were then two-roll milled on a Kobelco Stewart Boiling Inc. mill to ensure complete mixing and homogenization of the compound. The temperature of the roll mill was set to 155° C. In certain cases the catalyst master-batches were combined with the other ingredients just prior to extrusion rather than pre-compounded into the formulation, and this is pointed out specifically.

Silane-ethylene copolymer 1 is copolymer of ethylene and vinyltrimethoxysilane (1.5% by weight of the vinyltrimethoxysilane). Silane-ethylene copolymer 2 is copolymer of ethylene and vinyltrimethoxysilane (1.5% by weight of the vinyltrimethoxysilane) to which is added 0.5% by weight of octyltriethoxysilane.

MB1 (masterbatch 1) is low density polyethylene containing 1.7% by weight of dibutyltindilaurate.

MB2 (masterbatch 2) is low density polyethylene containing 2.6% by weight of dibutyltindilaurate.

Tape Extrusion

Tapes were extruded using a ¾" Brabender lab extruder with a polyethylene screw (3:1 compression ratio) and a 2" tape die with a 20 mil opening. The temperature profile was as follows: feed section 135-145° C., zone one 140-150° C., zone two 145-155° C., zone three and die 155-165° C. The screw was run at 10-20 rpm and the take-off speed was adjusted to give a 22-26 mil. tape thickness and 1.25" tape width. No screens were used. A vertical draw off from a 1" tape die onto the conveyor belt was also frequently used.

Wire Extrusion

Wire was extruded using a ¾" extruder with a polyethylene screw (3:1 compression ratio) and a Maddock mixing head at the metering section. A standard right angle flow with an adjustable die for centering was employed. An extruder tip with 0.067" aperture was used with a 0.064" solid copper conductor. The extruder rpm and conductor pulling speed were adjusted to 11 rpm and 5 ft/mm to give a wall thickness of 16 mil. The temperature profile from the feed section on was 170° C. zone 1, 180° C. zone 2, 185° C. zone 3 and 185° C. tape die. The melt temperature was approximately 145° C.

Gel Extractions

Gel contents were measured by extraction in boiling decalin at 180° C. for 5 hours according to ASTM 2765. The screens were dried in a vacuum oven at 150° C. for 15 hours.

Cure Conditions

Extruded tapes 22-26 mil thick and wires 16 mil thick were cured in a water bath at 90° C. for intervals of times that are indicated on individual graphs and in the text. In some examples a combination of temperatures such as 50° C. for a few hours and 90° C. for the next few was also used. Cure in a static steam tube for wire samples was carried out at 180° C. for either 15 minutes or 30 minutes.

Tensile Strength and Elongation

Tensile strength and elongation were measured on tapes or wires. The tape specimens were cut according to ASTM D638. The Instron 4200 machine was used by pulling at 2"/minute.

Level of Hydration

Thermogravimetric analysis (TGA) was used to monitor the conversion of MgO to $Mg(OH)_2$ in the various samples. The samples were heated in a nitrogen environment to 1000° C. at a rate of 20° C./min. The only residue expected to remain behind is MgO. This can be used to calculate the percentage of MgO hydrated after exposure to hot water/steam for different periods of time.

Limiting Oxygen Index

Limiting Oxygen Index (LOI) was measured using a Redcroft LOI instrument on 2.75"×0.25"×0.125" testing specimens according to ASTM D2863.

Hot Creep

The hot creep test was done either at 150° C. or 200° C. with a $20N/cm^2$ weight attached to the lower end of a tape cut out as a dog bone sample with a die cutter recommended per ASTM D412 type D. The percent elongation of the sample from its initial value was recorded after exposure in the oven for 15 minutes without removing the sample from the oven. The sample passes if the elongation is less than 100%.

Results and Discussion

Demonstration of in-situ hydration during moisture curing, and demonstration of effect of MgO characteristics.

The formulations shown in Table 1 were made using various grades of MgO. They demonstrate feasibility of doing the in-situ hydration and also provide important information about the effect of surface area, particle size and source of MgO. Example 1 used HSA-10, a MgO from Martin Marietta with an average particle size of 1 μm and a surface area of 160 $m^2/g$, Example 2 has HSA-30 which is a MgO that has an average particle size of 3 μm and a surface area of 160 $m^2/g$, Example 3 has MagChem 50 which is a MgO with a surface area of 65 $m^2/g$ and an average particle size of 5 μm. Example 4 has Super Premium MagOx supplied by Premier Chemicals. This grade of MgO has a surface area of 150 $m^2/g$ and an average particle size of 3 μm. Example 5 is made with MB2, which has more dibutyltindilaurate than MB1.

TABLE 1

| | Example | | | | |
| Formulation: | 1 | 2 | 3 | 4 | 5 |
| --- | --- | --- | --- | --- | --- |
| silane-ethylene copolymer 2 | 53.23 | 53.23 | 53.23 | 53.23 | 53.23 |
| MagChem HSA-10 (MgO) | 40.86 | 0.00 | 0.00 | 0.00 | 40.86 |
| MagChem HSA-30 (MgO) | 0.00 | 40.86 | 0.00 | 0.00 | 0.00 |
| MagChem 50 (MgO) | 0.00 | 0.00 | 40.86 | 0.00 | 0.00 |
| Magox Super Premium (MgO) | 0.00 | 0.00 | 0.00 | 40.86 | 0.00 |
| MB1 | 5.91 | 5.91 | 5.91 | 5.91 | 0.00 |
| MB2 | 0.00 | 0.00 | 0.00 | 0.00 | 5.91 |

Figure 1B:
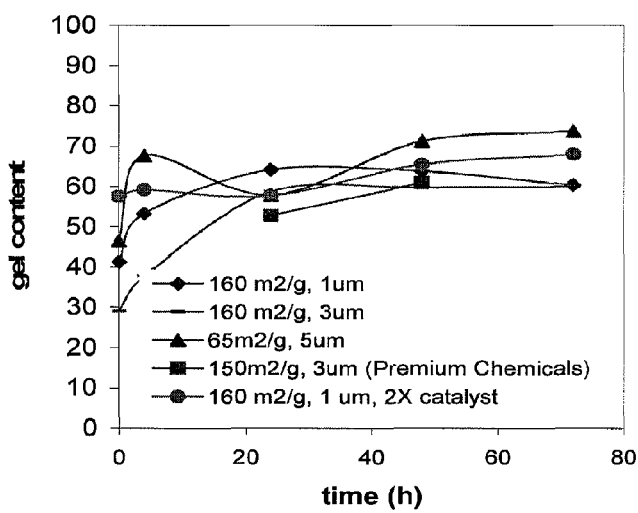
FIG. 1B is a line graph showing percentage gel content as the function of time in a 90° C. water bath.

At short times of cure in a 90° C. water bath there exists an inverse relationship between the gel content (shown in FIG. 1(b)) and percent conversion of MgO (shown in FIG. 1(a)). MagChem50, which has the lowest surface area and hence the least theoretical propensity for hydration, does indeed show the lowest percent conversion after 4 hours and shows the highest gel content. The results suggest that hydration and gel formation are competing reactions. For a similar surface area and supplier, a larger particle size (HSA-30 vs. HSA-10) seems to slow down the hydration rate but effects the gel contents marginally. Even though MagChem 50 starts out having slow conversion, near quantitative hydration is achieved in 48 h in a 90° C. water bath. Increasing the moisture cure catalyst concentration has an adverse effect on hydration as expected and slightly improves the gel contents. Even after complete hydration has occurred and water is available for cure (for example at time=72 h), the gel contents do not increase significantly. Differences in rates of hydration and cure with similar particle characteristics but different suppliers (HSA-30 vs. Super Premium MagOx) indicate that either the impurities and/or the level of the Mg(OH)$_2$ impurity in these grades can significantly effect rates of hydration and cure. Super Premium MagOx hydrates to completion the quickest and has a marginally lower gel content than HSA-30. Based on residual values of TGA, Super Premium MagOx has a higher level of Mg(OH)$_2$ impurity than either HSA-10 or MagChem 50, as shown in FIG. 2.

Interestingly, processability is significantly affected by choice of MgO used. When attempting to extrude Examples 1, 2, 3 and 5 (that cover a range of surface areas, shapes, particle sizes and MG(OH)2 impurity content) as a tape via a coat hanger die, processing difficulties were encountered resulting in tapes with irregular edges, whereas extrusion of Example 4 results in a normal tape. This points to certain impurities in all grades of MgO from Martin Marietta as a key factor adversely impacting processability, rather than any specific differences in shapes and sizes. The level of Mg(OH)$_2$ in these three grades is high enough that no distinction can be made between these grades based on this factor.

Only Example 3, with MagChem 50, passes the hot creep test at 200° C. after curing in a 90° C. water bath at 24 h. All the other Examples (1-2, 4-5) fail even after 72 h in a 90° C. water bath. This shows that intermediate surface area MgO, as represented by the 65 m$^2$/g material, allows an acceptable balance of cure and hydration under these conditions, since the higher surface area materials suffered from insufficient cure. Longer cure times did not help, presumably due to catalyst deactivation or extraction over time.

Effect of Volume Expansion

The theoretical volume of Examples 1 to 5 can be calculated on a 100 g basis as follows:

$$V_1 = \left(\frac{40.86}{3.58} + \frac{53.23}{0.92} + \frac{5.91}{0.92}\right)$$

The volume on complete hydration ($V_2$) can be calculated by knowing that 40.86 g of MgO will result in 59.11 g of Mg(OH)$_2$ with a specific gravity of 2.36.

$$V_2 = \left(\frac{59.11}{2.36} + \frac{53.23}{0.92} + \frac{5.91}{0.92}\right)$$

$$\left(\frac{V_2 - V_1}{V_1}\right)100 \sim 18\%$$

The theoretical expected change in volume is 18%. The experimentally measured change in dimensions of rectangular samples of the following examples measured after 72 hours in a 90° C. water bath (based on complete hydration shown in FIG. 1) are close to the theoretical predictions (see below).

| Example | Filler/Catalyst | % change in thickness | % change in width | % change in length | % change in volume |
|---|---|---|---|---|---|
| 1 | HSA-10/MB1 | 8.3 | 5.0 | 4.5 | 18.9 |
| 2 | HSA-30/MB1 | 4.4 | 4.4 | 4.0 | 13.3 |
| 3 | MagChem50/MB1 | 8.3 | 5.4 | 5.1 | 20.0 |
| 5 | HSA-10/MB2 | 8.0 | 6.8 | 5.0 | 21.1 |

It was feared that the volume expansion required to form Mg(OH)$_2$ from MgO would either result in negligible hydration (due to restriction by the semi-crystalline polymer) or result in physical damage to the polymer compound as the expansion occurs during hydration. The comparative samples (CS A and CS B) and Example 6 in Table 2 were exposed to hydration conditions then evaluated for tensile strength and elongation (FIG. 3). Surprisingly, not only did hydration occur readily, as demonstrated above, but the resulting mechanical properties were comparable to those obtained using Mg(OH)$_2$, which does not undergo any change during exposure to moisture (see tensile strength and elongation results below). Surprisingly, the sample surface remained smooth and regular even after hydration and expansion.

TABLE 2

| Formulation | CS A | Example 6 | CS B |
|---|---|---|---|
| silane-ethylene copolymer 2 | 95.00 | 53.23 | 45.00 |
| MagChem HSA-10 (MgO) | | 40.86 | |
| FR20S10 (Mg(OH)$_2$) | | | 50.00 |
| MB1 | 5.00 | 5.91 | 5.00 |

Effect of Polar Species

It was postulated that the rate of hydration and/or cure might be increased by addition of polar resins or additives that would increase the moisture uptake of the formulations and improve the rates of reactions. Referring to FIG. 4, Ex. 1A is the same composition as Example 1 discussed above. Ex. 7 is the same as Example 1, except that 5% by weight of the formulation is EVA (28% VA content) to replace 5% by weight of the silane-ethylene copolymer 2. Ex. 8 is LDPE containing 43.43% by weight of MgO (MagChem HSA-10). The test results are shown in FIG. 4. Ex. 7 with EVA passes the hot creep test within 24 hours in a 90° C. water bath. The gel content is indeed slightly higher for the sample containing the EVA, despite the lower concentration of crosslinkable resin silane-ethylene copolymer 2. Interestingly, the MgO in the LDPE sample (Ex. 8), without silane groups to compete for water, hydrated much faster than the samples containing silane-ethylene copolymer 2.

Extrusion Wire Coating

A formulation the same as Example 1 (except instead of MB1, a different masterbatch was used which contained 5 times as much dibutyltindilaurate as MB 1) was extruded on a solid 14 gauge copper conductor with an outer diameter of 96 mil. Conditions used for extrusion are described above in the experimental section. This demonstrates successful use in fabrication of a finished article.

Shelf-Life Stability

In the above formulations, significant gel formation occurred in the absence of a moisture cure catalyst. The formulations shown in Table 3 were made with the intention of characterizing rheological stability, processability, and percentage extractables (by decalin extraction) as a function of time to test the benefits of using MgO instead of Mg(OH)$_2$.

TABLE 3

| Formulation: | Ex. 9 | Ex. 10 | CS C | CS D | CS E | Ex. 11 | Ex. 12 |
|---|---|---|---|---|---|---|---|
| silane-ethylene copolymer 2 | 56.57 | 0.00 | 47.37 | 0.00 | 100.00 | 56.57 | 56.57 |
| LDPE | 0.00 | 56.57 | 0.00 | 47.37 | 0.00 | 0.00 | 0.00 |
| FR20S10 (Mg(OH)$_2$) | 0.00 | 0.00 | 52.63 | 52.63 | 0.00 | 0.00 | 0.00 |
| Aldrich 99% MgO | 0.00 | 0.00 | 0.00 | 0.00 | 0.00 | 43.43 | 0.00 |
| Super Premium Magox MgO | 0.00 | 0.00 | 0.00 | 0.00 | 0.00 | 0.00 | 43.43 |
| MagChem HSA-10 (MgO) | 43.43 | 43.43 | 0.00 | 0.00 | 0.00 | 0.00 | 0.00 |
| MB1 (1X catalyst) | 0.00 | 0.00 | 0.00 | 0.00 | 0.00 | 0.00 | 0.00 |
| Total | 100.00 | 100.00 | 100.00 | 100.00 | 100.00 | 100.00 | 100.00 |

Example 9 compares MgO in silane-ethylene copolymer 2 with MgO in LDPE (Ex. 10). Unlike a comparison of Ex. 1A and Ex. 8, a comparison of Example 9 vs. Example 10 is in the absence of a catalyst. CS C and CS D compare FR20S10, a leading Mg(OH)$_2$ flame retardant, in silane-ethylene copolymer 2 vs. LDPE respectively. CS E is the base resin silane-ethylene copolymer 2. Example 11 is with a 99% pure Aldrich MgO that has a high level of Mg(OH)$_2$ impurity but very little other impurities. Example 12 is with Super Premium MagOx that was previously shown to have good processability (extrusion as tape was good). All these formulations are extruded as tapes after standard Brabender compounding and roll-milling procedures at 150° C. as described earlier. The resulting percent extractables are shown in FIG. 5.

A good metric for comparison of gels is percent extractables which is defined as the (weight lost/original weight)× 100. The higher this number the better the shelf life stability of the formulation. It is obvious from FIG. 5 that silane-ethylene copolymer 2 (CS E), LDPE plus HSA-10 (Ex. 10) and LDPE plus FR20S10 (CS D) have no interactions and within experimental error give 100% extractables. Example 9 with HSA-10 and Example 11 with Aldrich MgO give comparable results to CS C with FR20S10 (Mg(OH)$_2$) in silane-ethylene copolymer 2. Thus these grades of MgO do not provide better shelf-life stability as compared to Mg(OH)$_2$.

However, Example 12 with Super Premium MagOx has a slightly better shelf-life stability over a five-week period than FR20S10 or any other grade of MgO. All samples were stored in sealed foil bags.

Table 4 shows the percent residue from TGA for Examples 9, 11 and 12. All these grades of MgO have a significant content of Mg(OH)$_2$ impurity in them, with Aldrich grade having the most and HSA-10 having the least. The level of Mg(OH)$_2$ does not correlate with the lowest extractables observed with Super Premium MagOx and we expect that given a certain level of Mg(OH)$_2$ impurity in each grade, the differences in extractables occur due to differences in other impurity levels.

TABLE 4

| | % residue from TGA | % Mg(OH)$_2$ impurity in the filler | net % Mg(OH)$_2$ impurity in the formulation | |
|---|---|---|---|---|
| Ex. 9 | 41.3 | 16.3 | 7.1 | HSA-10 |
| Ex. 11 | 37.2 | 46.8 | 20.3 | Aldrich 99% |
| Ex. 12 | 40.5 | 22.1 | 9.6 | S P MagOx |

In continuing the evaluation of various grades of MgO that would give better shelf life stability and to further understand processability issues, the formulations shown in Table 5 were made.

TABLE 5

| Formulation: | Ex. 13 | CS F | Ex. 14 | Ex. 15 (hydrated in 90 C. water bath for 72 h) | Ex. 16 | CS G | Ex. 17 | Ex. 18 |
|---|---|---|---|---|---|---|---|---|
| silane-ethylene copolymer 2 (1.5 wt % of VTMS) | 56.57 | 47.37 | 50.27 | 56.57 | 0 | 0 | 56.57 | 56.57 |

TABLE 5-continued

| Formulation: | Ex. 13 | CS F | Ex. 14 | Ex. 15 (hydrated in 90 C. water bath for 72 h) | Ex. 16 | CS G | Ex. 17 | Ex. 18 |
|---|---|---|---|---|---|---|---|---|
| silane-ethylene copolymer 1 | 0.00 | 0.00 | 0.00 | 0.00 | 56.57 | 47.37 | 0 | 0 |
| HSA-10 MgO | 0.00 | 0.00 | 0.00 | 43.43 | 0 | 0 | 0 | 0 |
| Super Premium Magox MgO | 0.00 | 0.00 | 49.73 | 0.00 | 43.43 | 0 | 0 | 0 |
| FR20S10 (Mg(OH)$_2$) | 0.00 | 0.00 | 0.00 | 0.00 | 0 | 52.63 | 0 | 0 |
| Aldrich 99.99% pure MgO | 0.00 | 0.00 | 0.00 | 0.00 | 0 | 0 | 43.43 | 0 |
| MagChem 10 S325 | 0.00 | 0.00 | 0.00 | 0.00 | 0 | 0 | 0 | 43.43 |
| Barcroft 5250 (Mg(OH)$_2$) | 0.00 | 52.63 | 0.00 | 0.00 | 0 | 0 | 0 | 0 |
| Dead Sea MgO RA150 | 43.43 | 0.00 | 0.00 | 0.00 | 0 | 0 | 0 | 0 |
| Total | 100.00 | 100.00 | 100.00 | 100.00 | 100.00 | 100.00 | 100.00 | 100.00 |
| Density | 1.36 | 1.36 | 1.46 | 1.36 | 1.36 | 1.36 | 1.36 | 1.36 |

Example 13 contains RA-150, a MgO from Dead Sea Bromine Group having similar surface area and average particle size as HSA-10. Example 14 is made with a higher loading of Super Premium MagOx to compensate for the fact that it has a lower effective MgO content than Example 9. A very high purity grade of MgO from Aldrich is used in Example 17 (still contains a lot of Mg(OH)$_2$ impurity) and a dead burnt grade of MgO (MagChem 10 325S) with impurities but very little Mg(OH)$_2$ content is used in Example 18. Table 6 below shows that the percentage of Mg(OH)$_2$ impurity in the various formulations and FIG. 6 shows the percentage extractables for these formulations monitored over a three week period during storage in sealed foil bags. Note that none of these formulations contain tin catalyst. The tin catalyst is often added at the fabricating extruder as a masterbatch. The idea here is to test these under conditions that represent storage of the compound prior to encountering any tin catalyst.

TABLE 6

| | % residue from TGA | % Mg(OH)$_2$ impurity in the filler | net % Mg(OH)$_2$ impurity in the formulation | |
|---|---|---|---|---|
| Ex. 13 | 40.3 | 22.3 | 10.1 | Dead Sea RA-150 |
| Ex. 14 | 46.2 | 24.6 | 12.3 | S P Magox |
| Ex. 18 | 43.1 | 2.4 | 1.0 | MagChem 10 325S |
| Ex. 17 | 42.5 | 7.3 | 3.2 | Aldrich 99.99% |

The dead-burnt grade of MgO MagChem 10 325 S (Example 18) indeed has the lowest content of Mg(OH)$_2$ impurity and over a three week period shows 100% extractables (FIG. 6). This strongly supports the lack of specific interaction between MgO and silane-ethylene copolymer 2, but rather high surface area Mg(OH)$_2$ or other impurities are the cause of interactions that lead to gel formation. The fact that Ex. 17 with Aldrich 99.99% (that has hardly any impurities except about 7.3% Mg(OH)$_2$) shows low extractables indicates that even low levels (7%) of Mg(OH)$_2$ can cause significant gel formation and low extractables. Super Premium MagOx (Example 12), that had been the leading high surface area MgO in terms of extractables, at a higher loading level (Example 14) shows low extractables due to a higher effective Mg(OH)$_2$ content. RA-150, (Example 13) seems to do worse than FR20S10 (CS C). Using silane-ethylene copolymer 1 instead of silane-ethylene copolymer 2 does provide a marginal improvement with Super Premium MagOx. In order to achieve good shelf-life stability in terms of extractables, it is important to have low content of Mg(OH)$_2$ impurity in the grade of MgO. This is possible by using a low surface area grades of MgO that is intermediate between the dead-burnt grades like MagChem 325S and the highly actives grades like Super Premium MagOx.

A comparison of the impurities and physical properties of different grades of MgO is made in Table 7.

TABLE 7

| | SPM | RA-150 | Aldrich 99% | HSA-10 | MagChem 10 325S | Aldrich 99.99% |
|---|---|---|---|---|---|---|
| MgO | 98.4 | 99.7 | — | 98.36 | 98.2 | — |
| CaO | 0.65 | 0.02 | 0.52 | 0.82 | 0.9 | 45.7 ppm |
| SiO$_2$ | 0.45 | 0.03 | — | — | 0.4 | — |
| Fe$_2$O$_3$ | 0.12 | 63 ppm | 0.07 | — | 0.2 | 3.2 ppm |
| Al$_2$O$_3$ | 0.12 | 29 ppm | 0.03 | — | 0.1 | — |
| B$_2$O$_3$ | 0.25 | — | 0.024 | — | — | — |
| Na | — | 31 ppm | 0.019 | — | — | 4.75 ppm |

TABLE 7-continued

|  | SPM | RA-150 | Aldrich 99% | HSA-10 | MagChem 10 325S | Aldrich 99.99% |
|---|---|---|---|---|---|---|
| K | — | 3 ppm | 34.1 ppm | — | — | 4.13 ppm |
| Chrloride | 0.1 | 0.08 | — | 0.32 | 0.01 | — |
| Sulfate | 0.7 | 0.17 | — | — | 0.01 | — |
| Loss on Ignition % | 8 | 6.6 | 9.96 | 5.5 | 0.25 | — |
| Surface Area | 150 | 187 | — | 163 | — | — |
| PAL Lab LOI | 8.45 | — | — | 5.22 | — | — |
| Average Particle Size | 3 μm | — | 0.36 μm | 0.95 μm | 9 μm | — |

All these formulations, even when exposed to air, are stable with regard to hydration, i.e. the $Mg(OH)_2$ content does not increase at room temperature for months. Thus, the MgO is not expected to provide protection against atmospheric moisture during storage. These results establish that hydration will not happen at a significant rate at ambient temperature, and therefore, surprisingly, a post compounding hydration step at elevated temperature is required to convert the MgO into $Mg(OH)_2$.

Effect of MgO Characteristics on Processability

Table 8 summarizes the quality of the tape and ease of processability (the head pressures in the extruder) with different grades of MgO and $Mg(OH)_2$ in different resin systems. The fact that head pressures are lower with LDPE (Ex. 10) as compared to silane-ethylene copolymer 2 (Example 9) indicates lack of interactions between LDPE and filler. Extrusion of a good tape with Super Premium MagOx (Example 12) and Aldrich 99% (Example 11) in spite of a high $Mg(OH)_2$ content of a high surface area is indicative of the role of impurities. CS F is made with a grade of $Mg(OH)_2$ from SPI Pharma Barcroft 5250 that has a surface area of 74 $m^2/g$ and an average particle size of 38 μm. This formulation could not be extruded due to head pressures exceeding 10,000 psi indicating very strong interactions between silane-ethylene copolymer 2 and a high surface area $Mg(OH)_2$. This result shows that in addition to impurities a high content of high surface area $Mg(OH)_2$ can adversely affect the processability and the difficulty in processing (higher head pressures) MgO containing compounds may be traced back to high surface area $Mg(OH)_2$ impurity in these grades of MgO. On hydrating Ex. 8, in-situ creation of a high surface area $Mg(OH)_2$ in a LDPE resin occurs. On grinding up this tape and extruding this again through a tape die, no difficulty is encountered during extrusion. Low head pressures are also observed with ethylene-silane copolymer 2 and MagChem 10 325 (Ex. 18) that does not have a significant level of $Mg(OH)_2$ impurity. This confirms that a specific interaction between silane-ethylene copolymer 2 and high surface area $Mg(OH)_2$ is a key contributor to high head pressures. The term "Christmas Tree" in Table 8 refers to tapes with irregularly-shaped edges due to flow irregularities.

TABLE 8

|  | Resin | Filler | Supplier | psi | Tape | Surface Area | Particle Size | % $Mg(OH)_2$ in the formulation |
|---|---|---|---|---|---|---|---|---|
| Ex. 9 | silane-ethylene copolymer 2 | HSA-10 (MgO) | Martin Marietta | 5500 | Christmas tree | 160 | 1 | 7.1 (impurity) |
| Ex. 10 | DXM-445 | HSA-10 (MgO) | Martin Marietta | 2500 | Good | 160 | 1 | 7.1 (impurity) |
| CS C | silane-ethylene copolymer 2 | FR20S10($Mg(OH)_2$) | Dead Sea Brominie Group | | Good | 10 | 1.1 | 52.63 |
| CS D | DXM-445 | FR20S10($Mg(OH)_2$) | Dead Sea Brominie Group | | Good | 10 | 1.1 | 52.63 |
| CS E | silane-ethylene copolymer 2 | None | — | 800 | Good | — | — | — |
| Ex. 11 | silane-ethylene copolymer 2 | Aldrich 99% (MgO) | Aldrich | 3300 | Good | — | 9 | 20.3 (impurity) |
| Ex. 12 | silane-ethylene copolymer 2 | Super Premium MagOx (MgO) | Premier Chemicals | 3500 | Good | 150 | 3 | 9.6 (impurity) |
| Ex. 13 | silane-ethylene copolymer 2 | RA-150 (MgO) | Dead Sea Bromine Group | 6700 | Christmas Tree | 187 | — | 10.1 (impurity) |
| CS F | silane-ethylene copolymer 2 | Barcroft 5250 $Mg(OH)_2$ | SPI Pharma | >10,000 | Not possible | 74 | 34 | 52.63 |
| Ex. 14 | silane-ethylene copolymer 2 | Super Premium MagOx (MgO) | Premier Chemicals | 9400 | Christmas tree | 150 | 1 | 12.3 (impurity) |

TABLE 8-continued

|  | Resin | Filler | Supplier | psi | Tape | Surface Area | Particle Size | % Mg(OH)$_2$ in the formulation |
|---|---|---|---|---|---|---|---|---|
| Ex. 17 | silane-ethylene copolymer 2 | Aldrich 99.99% (MgO) | Aldrich | — | Not possible | — | — | 3.2 (impurity) |
| Ex. 18 | silane-ethylene copolymer 2 | MagChem 10 S 325 | Marine Marietta | 1900 | Good | Low (1-10) | — | 1 (impurity) |
| Ex. 16 | silane-ethylene copolymer 1 | Super Premium MagOx(MgO) | Premier Chemicals | 4100 | Good | 150 | 1 | 9.6 (estimated impurity) |
| CS G | silane-ethylene copolymer 1 | FR20S10(Mg(OH)$_2$) | Dead Sea Bromine Group | 1700 | Good | 150 | 1 | 52.63 |

Flame Performance

Example 7, discussed above, was tested for limiting oxygen index (LOI). The LOI was 25%, in the range expected for polyethylene containing around 50% by weight of Mg(OH)$_2$. In contrast, PE without flame retardant is known to have a LOI of less than 20%. Cone calorimetry results are also consistent with formation of Mg(OH)$_2$ upon hydration of MgO. These results establish that the desired flame retardancy has been achieved.

Cure in a static steam tube and with a combination regime of temperatures in a water bath.

The formulations shown in Table 9 were prepared and extruded on a 14 gauge solid copper conductor with the moisture cure catalyst masterbatches added directly to the hopper without being pre-compounded with the rest of the components. To avoid static charge and inhomogenous mixing a coarse grinding of the formulation was used, and a ground strap on the hopper was implemented. Also based on learnings from the sets of experiments described earlier it is obvious that though both hydration and cure reactions compete for moisture, the activation energy of hydration is higher than the activation energy of the cure reaction. The cure reaction is faster at lower temperatures whereas hydration reaction is faster at higher temperatures. Thus an optimization of rates can be attempted wherein the formulations are cured at 50° C. to boost the cure rate for the first 24 hours and then at 90° C. for a further 24-48 hours to boost the hydration rate. This might enable higher gel content by crosslinking before catalyst deactivation or catalyst leaching. Example 19 is the control with Super Premium MagOx and MB1. Example 24 is with silane-ethylene copolymer 1. Example 20 has 2.5 wt % of Elvax 265 and 2.5 wt % of a silicone masterbatch also based on EVA to improve surface finish. Example 21 is made with a distannoxane tin catalyst masterbatch. This distannoxane catalyst had been previously shown to be very effective for crosslinking silane functional polymers. Example 23 is with a Fusabond 493 maleic anhydride-grafted polyethylene coupling agent. This very low density resin is expected to be a better filler acceptor as well as an effective coupling agent for the hydrated MgO. Example 22 is prepared with MagOx 98 LR that was identified in shelf-stability studies to have good processability, 100% extractables, low content of Mg(OH)$_2$ impurity and impurity levels that did not adversely affect processability.

TABLE 9

| Formulation | Ex. 19 | Ex. 20 | Ex. 21 | Ex. 22 | Ex. 23 | Ex. 24 |
|---|---|---|---|---|---|---|
| silane-ethylene copolymer 2 | 53.23 | 48.23 | 53.23 | 53.23 | 48.23 | 0.00 |
| silane-ethylene copolymer 1 | 0.00 | 0.00 | 0.00 | 0.00 | 0.00 | 53.23 |
| MagOx 98 LR | 0.00 | 0.00 | 0.00 | 40.86 | 0.00 | 0.00 |
| Super Premium Magox MgO | 40.86 | 40.86 | 40.86 | 0.00 | 40.86 | 40.86 |
| Fusabond 493 | 0.00 | 0.00 | 0.00 | 0.00 | 5.00 | 0.00 |
| Elvax 265 | 0.00 | 2.50 | 0.00 | 0.00 | 0.00 | 0.00 |
| MB50-320 | 0.00 | 2.50 | 0.00 | 0.00 | 0.00 | 0.00 |
| MB1 (1X catalyst) | 5.91 | 5.91 | 0.00 | 5.91 | 5.91 | 5.91 |
| Masterbach 61-1 | 0.00 | 0.00 | 5.91 | 0.00 | 0.00 | 0.00 |
| Total | 100.00 | 100.00 | 100.00 | 100.00 | 100.00 | 100.00 |

Formulation:
Masterbatch-61-1
DFH-2065 93.30
Dibutyldiacetoxytin 0.00
Distannoxane 1.70
Irganox 1010 FF 3.33
Irganox MD 1024 1.67

FIG. 7 shows the extent of hydration on exposure to different hydration conditions. In a static steam tube, exposure to steam at 180° C. for 15 minutes gave near complete conversion with silane-ethylene copolymer 2 and Super Premium MagOx (Ex. 19), including formulations with 5 wt % Fusabond 493 and with the Elvax and silicone masterbatch (Ex. 20). 65% conversion with 15 minutes exposure and near complete conversion with 30 minutes exposure was achieved with the distannoxane tin catalyst masterbatch (Ex. 21). The low surface area MagOx 98 LR (Ex. 22) gave 82% conversion with 15 minutes exposure and complete conversion with 30 minutes exposure. As expected the rates of hydration are slowed down on exposure to a water bath at 50° C.; Example 19, distannoxane masterbatch (Ex. 21) and Elvax (Ex. 20) containing samples do not reach complete conversion even after 48 h in 90° C. water bath, however samples with silane-ethylene copolymer 1 (Ex. 24) and Fusabond 493 (Ex. 23) do.

The gel content on exposure to a steam tube environment as shown in FIG. 8 is consistently lower than the combination regime of temperatures in a water bath which is expected since low temperatures favor cure reactions. Also the hydrolytic and thermal stability of the dibutyltindiaurate catalyst used in a steam tube environment is questionable. However in comparison a distannoxane tin catalyst is more effective at catalyzing the cure reaction compared to the control (dibutyltindilaurate) both in a steam tube and in a water bath. Using MagOx 98LR, a low surface area MgO does not scavenge away as much moisture from the cure reaction towards hydration as the high surface area Super Premium MagOx, therefore the gel contents with this grade are higher as compared to the control (Example 19) in a steam tube environment. This grade was not tested in a water bath environment. One surprising result seems to be the high gel contents in the presence of Fusahond 493. However, the gel content at t=0 itself is higher implying some cure reaction takes place during extrusion itself. Perhaps the maleic anhydride graft to the Fusabond is an effective moisture cure catalyst once it is converted to its acid form by reaction with water. No difference is observed between silane-ethylene copolymer 1 vs. silane-ethylene copolymer 2. Addition of Elvax 265 and the silicone masterbatch proves effective in improving gel contents in a water bath environment. Overall using a combination regime of temperatures might be marginally better than using a single high temperature.

The disclosure and examples that have been presented include certain hypotheses and speculations as to underlying causes of the results. Such hypotheses and speculations are included solely for guidance to those wishing to practice this invention, and may be incomplete or incorrect. The inventors are not bound to such hypotheses and speculations and the scope of the disclosure and claims are to be interpreted without reference to the hypotheses and speculations.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A method to make a flame retardant composition, the method comprising:

first melt compounding one or more polymers with at least 10% by weight, based on the weight of the polymers, of magnesium oxide; and, second reacting at least 50% of the magnesium oxide with water within the composition to form magnesium hydroxide.

2. The method of claim 1, wherein the one or more polymers are melt compounded with at least 20% by weight, based on the total weight of the polymers, magnesium oxide.

3. The method of claim 1, wherein the one or more polymers are melt compounded with at least 30% by weight, based on the total weight of the polymers, magnesium oxide.

4. The method of claim 1, wherein at least 75% of the magnesium oxide is reacted to form magnesium hydroxide.

5. The method of claim 1, wherein the reaction is done at a temperature above room temperature but below melting point temperatures of the one or more polymers.

6. The method of claim 1, wherein the reaction is done at a temperature above melting point temperatures of the one or more polymers.

* * * * *